Oct. 23, 1923.
J. M. AXTELL
1,471,818
SELF LUBRICATING PITMAN ROD
Filed Nov. 4, 1921
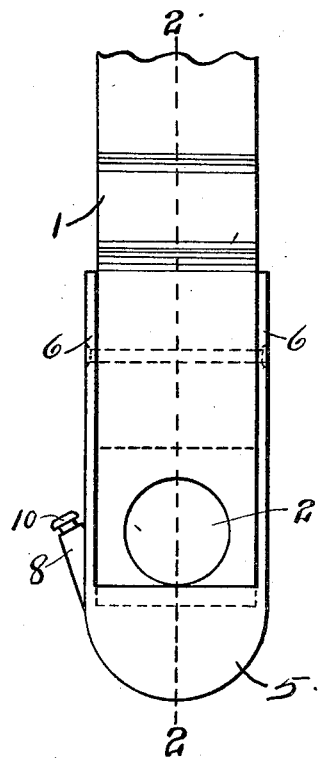
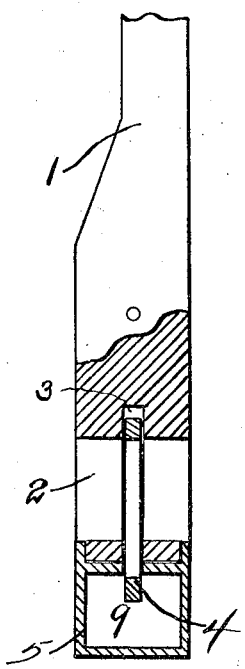
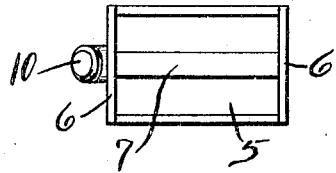
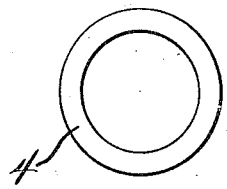
Inventor
JAY M. AXTELL.
By A. L. Jackson
Attorney Patented Oct. 23, 1923.

1,471,818

UNITED STATES PATENT OFFICE.

JAY M. AXTELL, OF FORT WORTH, TEXAS.

SELF-LUBRICATING PITMAN ROD.

Application filed November 4, 1921. Serial No. 512,809.

*To all whom it may concern:*

Be it known that I, JAY M. AXTELL, a citizen of the United States, residing at Fort Worth, in the county of Tarrant and State of Texas, have invented certain new and useful Improvements in Self-Lubricating Pitman Rods, of which the following is a specification.

This invention relates to pitman rods and means for oiling the same; and the object is to provide a pitman rod at the end with means for keeping the wrist pin lubricated at small expense for making the pitman rods more efficient in operation and for prolonging the life of the wrist pins. Other objects and advantages will be fully explained in the following description and the invention will be more particularly pointed out in the claims.

Reference is had to the accompanying drawings which form a part of this application.

Fig. 1 is a face view of a part of a pitman rod. Fig. 2 is an edge view, partly in section. Fig. 3 is a plan view of the oil cup. Fig. 4 is a detail view of the oiling ring.

Similar characters of reference are used to indicate the same parts throughout the several views.

The pitman rod 1 has the usual opening 2 for a wrist pin. The lower end of the rod 1 has a slot 3 longitudinally of the rod transversely through the opening or slot 2. A ring 4 hangs loosely on the wrist pin and projects downwardly below the wrist pin. An oil cup 5 has a socket to receive the end of the pitman rod and straps 6 project from the oil cup for attaching the oil cup to the pitman rod. The oil cup 5 has a cavity 9 for carrying a supply of lubricant material. The ring 4 projects through a slot 7 in the upper side of the cup. The ring 4 will turn loosely on the wrist pin and carry sufficient oil to lubricate the wrist pin. The rod 1 may be made of wood or metal. The cup 5 is provided with a filling nozzle 8 to be kept closed by a plug 10. The improved lubricating means are particularly useful on windmill pitman rods, pumpjack pitmans, and the like. The cup may be made integral with the pitman rod. The improved oiling means are adapted to make provision for lubricating the wrist pins for long periods of time. The ring 4 projects down into the lubricant and will carry a limited amount of the lubricant as it is turned loosely on the wrist pin.

What I claim, is,—

1. An oil cup for pitman rods having a socket to receive the end of a pitman rod, arms projecting therefrom to be attached to the pitman rod, and said pitman rod having a slot for a lubricating ring and said oil cup having a slot in the upper side in line with the slot in said pitman rod for receiving a lubricating ring.

2. A self lubricating pitman rod having the usual opening for a wrist pin and having a slot in the end transverse to and cutting across the wrist pin opening, and an oil cup having a socket to receive the end of the pitman rod and arms to be attached to the pitman rod and having a cavity and a slot adjacent to the end of the pitman rod for receiving an oiling ring.

3. A self lubricating pitman rod having an opening for a wrist pin and a slot in the end extending across said opening and an oil cup mounted on the end of the pitman rod provided with arms for attaching the cup to said rod and having a slot in the side adjacent to the end of the pitman rod registering with the slot in the end of said pitman rod.

4. An oil cup for pitman rods having a socket to receive the end of a pitman rod, arms projecting therefrom to be attached to a pitman rod, a filling nozzle, and having a cavity for the lubricant and slot opening into said cavity for supplying the lubricant to the end of the pitman rod.

5. In a pitman rod provided with an opening for a wrist pin and a slot in the end extending across said opening, an oil cup provided with a socket to receive the end of the pitman rod and arms to be attached to the pitman rod and provided with a lubricant carrying cavity and a slot opening into said cavity and registering with the slot in the end of said pitman rod.

6. A pitman rod having an opening for a wrist pin and having a slot surrounding said opening and at right angles thereto, an oil cup on the end of said rod having a cavity for carrying a lubricant and having a slot forming an opening into said cavity registering with the slot in said rod, and a filling nozzle for said cavity.

In testimony whereof I set my hand this 29th day of October, 1921.

JAY M. AXTELL.